United States Patent
Terwilliger et al.

(10) Patent No.: US 12,331,680 B2
(45) Date of Patent: Jun. 17, 2025

(54) TURBINE ENGINE BOTTOMING CYCLE HEAT EXCHANGER BYPASS

(71) Applicant: RTX CORPORATION, Farmington, CT (US)

(72) Inventors: Neil J. Terwilliger, Cheshire, CT (US); Brandon M. Evans, San Antonio, TX (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/529,081

(22) Filed: Dec. 5, 2023

(65) Prior Publication Data

US 2024/0318593 A1    Sep. 26, 2024

Related U.S. Application Data

(60) Provisional application No. 63/443,109, filed on Feb. 3, 2023, provisional application No. 63/443,113, filed on Feb. 3, 2023.

(51) Int. Cl.
*F02C 6/18* (2006.01)
*F03G 7/06* (2006.01)

(52) U.S. Cl.
CPC ............ *F02C 6/18* (2013.01); *F03G 7/0641* (2021.08); *F05D 2220/323* (2013.01)

(58) Field of Classification Search
CPC ........................... F05D 2220/323; F02C 6/18
See application file for complete search history.

(56) References Cited

U.S. PATENT DOCUMENTS

| 7,380,749 B2 | 6/2008 | Fucke et al. |
| 9,410,451 B2 | 8/2016 | Laing et al. |
| 11,047,307 B2 | 6/2021 | Roberge |
| 11,480,102 B2 | 10/2022 | MacDonald |
| 2016/0123226 A1* | 5/2016 | Razak ............... F02C 7/18 60/39.15 |
| 2017/0081040 A1 | 3/2017 | Pal |
| 2019/0128189 A1* | 5/2019 | Rambo ............... F02K 3/115 |
| 2020/0224589 A1* | 7/2020 | McAuliffe .......... F01K 23/10 |
| 2021/0222619 A1* | 7/2021 | Boucher ............. F02C 6/18 |
| 2021/0348561 A1 | 11/2021 | Cocks et al. |

FOREIGN PATENT DOCUMENTS

CN    107939528 A    4/2018

OTHER PUBLICATIONS

Extended European Search Report for European Application No. 24155872.5 mailed Jun. 17, 2024.

* cited by examiner

*Primary Examiner* — David P. Olynick
(74) *Attorney, Agent, or Firm* — Carlson, Gaskey & Olds, P.C.

(57) ABSTRACT

An aircraft propulsion system includes a core engine assembly that generates an exhaust gas flow, a bottoming cycle that includes a bottoming fluid flow that is expanded through a bottoming turbine, a first heat exchanger where heat from the exhaust gas flow is transferred to heat the bottoming fluid flow, and a second heat exchanger where heat from a secondary heat source is transferred to heat the bottoming fluid flow. The second heat exchanger is disposed upstream of the first heat exchanger such that heat from the secondary heat source preheats the bottoming fluid flow prior to accepting heat from the exhaust gas flow in the first heat exchanger.

18 Claims, 3 Drawing Sheets

TURBINE ENGINE BOTTOMING CYCLE HEAT EXCHANGER BYPASS

CROSS REFERENCE TO RELATED APPLICATION

This application claims priority to U.S. Provisional Application Ser. Nos. 63/443,109 and 63/443,113 both filed on Feb. 3, 2023.

TECHNICAL FIELD

The present disclosure relates generally to a bottoming cycle for a turbine engine and more particularly to a bottom cycle including a heat exchanger bypass flow path for increasing heat recovery compacity.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate a high energy exhaust gas flow. Energy in the high energy exhaust flow is recovered as it is expanded through a turbine section. Heat from the exhaust gas flow may be recovered in a bottoming cycle. The bottoming cycle may also recover heat from other engine and aircraft systems. Increasing heat recovery from other engine and aircraft systems can reduce a capacity of the bottoming cycle to recover heat from the exhaust gas flow.

Turbine engine manufacturers continue to seek further improvements to engine performance, including improvements to reduce environmental impact while improving thermal and propulsive efficiencies.

SUMMARY

An aircraft propulsion system according to an exemplary embodiment of this disclosure, among other possible things includes, a core engine assembly that generates an exhaust gas flow, a bottoming cycle that includes a bottoming fluid flow that is expanded through a bottoming turbine, a first heat exchanger where heat from the exhaust gas flow is transferred to heat the bottoming fluid flow, a second heat exchanger where heat from a secondary heat source is transferred to heat the bottoming fluid flow, the second heat exchanger is disposed upstream of the first heat exchanger such that heat from the secondary heat source preheats the bottoming fluid flow prior to accepting heat from the exhaust gas flow in the first heat exchanger, and a bypass flow passage where at least a portion of the bottoming fluid flow is routed around the second heat exchanger and into thermal communication with the exhaust gas flow in the first heat exchanger.

In a further embodiment of the foregoing aircraft propulsion system, the bottoming cycle includes a bottoming compressor that compresses the bottoming fluid flow upstream of at least the first heat exchanger.

In a further embodiment of any of the foregoing aircraft propulsion systems, the bottoming compressor is coupled to the bottoming turbine.

In a further embodiment of any of the foregoing aircraft propulsion systems, an exhaust bottoming fluid flow expelled from the bottoming turbine is communicated through the second heat exchanger for heating the bottoming fluid flow.

In a further embodiment of any of the foregoing aircraft propulsion systems, the secondary heat source includes at least one of an engine lubrication system, a power electronic system or an electric machine.

In a further embodiment of any of the foregoing, the aircraft propulsion system includes a control valve that regulates the bottoming fluid flow through the bypass flow passage and a controller that is programmed to operate the control valve to regulate bottoming fluid flow through the bypass flow passage based on temperature differential between the exhaust gas flow and the bottoming fluid flow to maintain a capacity of the bottoming fluid flow to absorb heat from the exhaust gas flow within a predefined range.

In a further embodiment of any of the foregoing, the aircraft propulsion system includes at least a third heat exchanger where heat from a third heat source is communicated into the bottoming fluid flow and the bypass flow passage includes a portion that bypasses the third heat exchanger.

In a further embodiment of any of the foregoing aircraft propulsion systems, the bottoming turbine generates shaft power that is coupled to drive at least one auxiliary system.

In a further embodiment of any of the foregoing, the aircraft propulsion system includes a fuel system that is configured to supply a fuel flow to the core engine. The fuel system includes at least one fuel system heat exchanger that is configured to accept heat from the bottoming fluid flow.

In a further embodiment of any of the foregoing, the aircraft propulsion system includes a fuel system turboexpander where a fuel flow heated in the fuel system heat exchanger is expanded to generate shaft power.

In a further embodiment of any of the foregoing aircraft propulsion systems, the first heat exchanger includes a plurality of stages that are arranged from a forward stage to an aft stage and the bottoming fluid flow communicated through the bypass flow passage is communicated to the aft stage.

A bottoming cycle assembly for an aircraft propulsion system according to another exemplary embodiment of this disclosure, among other possible things includes, a first heat exchanger where heat from an exhaust gas flow is transferred to heat the bottoming fluid flow, a second heat exchanger where heat from a secondary heat source is transferred to heat the bottoming fluid flow, the second heat exchanger is disposed upstream of the first heat exchanger such that heat from the secondary heat source preheats the bottoming fluid flow prior to accepting heat from the exhaust gas flow in the first heat exchanger, a bottoming turbine where the heated bottoming fluid flow expands to drive a shaft, and a bypass flow passage where at least a portion of the bottoming fluid flow is routed around the second heat exchanger and into thermal communication with the exhaust gas flow in the first heat exchanger.

In a further embodiment of the foregoing bottoming cycle assembly, the bottoming cycle includes a bottoming compressor that is coupled to the bottoming turbine. The bottoming compressor compresses the bottoming fluid flow upstream of at least the first heat exchanger.

In a further embodiment of any of the foregoing bottoming cycle assemblies, the bottoming fluid flow expelled from the bottoming turbine is communicated through the second heat exchanger for heating the bottoming fluid flow.

In a further embodiment of any of the foregoing bottoming cycle assemblies, the first heat exchanger includes a plurality of stages that are arranged from a forward stage to an aft stage and the bottoming fluid flow communicated through the bypass flow passage is communicated to the aft stage.

In a further embodiment of any of the foregoing, the bottoming cycle assembly includes a control valve that regulates the bottoming fluid flow through the bypass flow passage and a controller that is programmed to operate the control valve to regulate bottoming fluid flow through the bypass flow passage based on temperature differential between the exhaust gas flow and the bottoming fluid flow to maintain a capacity of the bottoming fluid flow to absorb heat from the exhaust gas flow within a predefined range.

In a further embodiment of any of the foregoing, the bottoming cycle assembly includes at least one fuel system heat exchanger that is configured to communicate heat from the bottoming flow into a fuel flow and a fuel system turboexpander where a fuel flow heated in the fuel system heat exchanger is expanded to generate shaft power.

A method of recovering heat energy with a bottoming cycle of an aircraft propulsion system, the method, according to another exemplary embodiment of this disclosure, among other possible things includes configuring a first heat exchanger to transfer heat from an exhaust gas flow of a core engine is transferred to heat a bottoming fluid flow, configuring a second heat exchanger to transfer heat from a secondary heat source into the bottoming fluid flow before transferring heat into the bottoming fluid flow from the exhaust gas flow in the first heat exchanger, bypassing a portion of the bottoming fluid flow around the second heat exchanger through a bypass flow passage such that heat from the secondary heat source is not input into the bottoming fluid flow prior to heat from the exhaust gas flow, and expanding the bottoming fluid flow through a bottoming turbine to generate shaft power.

In a further embodiment of the foregoing method, the bottoming cycle includes a bottoming compressor that is coupled to the bottoming turbine. The bottoming compressor compressing the bottoming fluid flow upstream of at least the first heat exchanger and an exhaust bottoming fluid flow expelled from the bottoming turbine is communicated through the second heat exchanger for heating the bottoming fluid flow before being compressed in the bottoming compressor.

In a further embodiment of any of the foregoing, the method includes regulating a flow of bottoming fluid flow through the bypass flow passage with a control valve that is operated by a controller that is programmed based on temperature differential between the exhaust gas flow and the bottoming fluid flow to maintain a capacity of the bottoming fluid flow to absorb heat from the exhaust gas flow within a predefined range.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
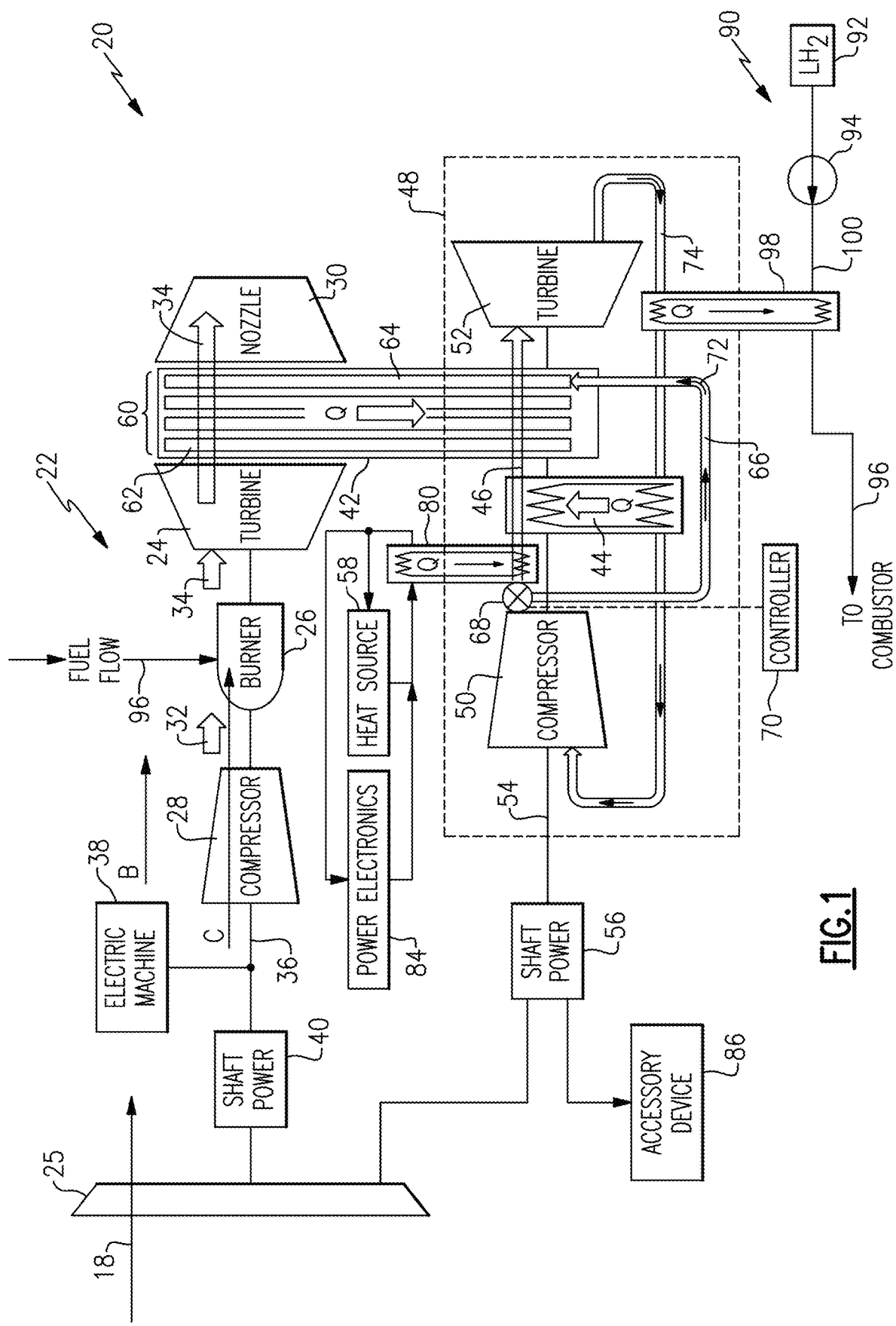
FIG. 1 is a schematic view of an example turbine engine and bottoming cycle embodiment.

FIG. 1 schematically illustrates an aircraft propulsion system 20 including a core engine 22 and a bottoming cycle 48 with a bypass passage around secondary heat sources for a bottoming cycle flow. The bypass passage routes the bottoming cycle flow around other sources of heat to provide a desired amount of waste heat capture from an exhaust gas flow.

The core engine 22 includes a compressor section 28, a combustor section 26 and the turbine section 24 disposed serially along an engine axis A. The turbine section 24 generates shaft power 40 that drives the compressor 28 and a propulsive fan 25 through a shaft 36. An inlet airflow 18 is driven along a bypass flow path B and a core flow path C. In the compressor 28, a core flow 32 is compressed and communicated to the combustor 26. In the combustor 26, the compressed core airflow 32 is mixed with fuel and ignited to generate a high energy combusted exhaust gas flow 34 that expands through the turbine 24 where energy is extracted and utilized to drive the compressor 28 and the propulsive fan 25 before being exhausted through nozzle 30. An electric machine 38 may be coupled to the shaft 36 and operate as either a generator to produce electric power or as an electric motor to input additional power.

A fuel system 90 includes at least a fuel tank 92 and a fuel pump 94 to provide a fuel flow 100 that is eventually communicated to the combustor 26. The example fuel system 90 is configured to provide a hydrogen-based fuel such as a liquid hydrogen ($LH_2$). Although hydrogen is disclosed by way of example, other non-carbon-based fuels could be utilized and are within the contemplation of this disclosure. Moreover, the disclosed features may also be beneficial in an engine configured to operate with traditional carbon fuels and/or biofuels, such as sustainable aviation fuel.

Although an example core engine 22 is disclosed by way of example, other engine configurations and architectures could be utilized and are within the scope and contemplation of this disclosure.

Heat from the exhaust gas flow 34 is recaptured by the bottoming cycle 48. The example bottoming cycle 48 includes a bottoming fluid flow 46 that is heated in a heat exchanger 42 by the exhaust gas flow 34. The heated bottoming fluid flow 46 is expanded through a turbine 52 to generate shaft power 56. The shaft power 56 can be utilized to power engine accessory components and devices and/or be coupled to drive the propulsive fan 25.

The example bottoming cycle 48 is a closed loop cycle where the bottoming fluid flow 46 is compressed in a bottoming compressor 50 heated by heat communicated from the exhaust gas flow 32 in the first heat exchanger 42 and expanded through the bottoming turbine 52. The bottoming turbine 52 produces shaft power 56 through a shaft 54 for driving the compressor section 50 and other accessory devices and/or auxiliary systems, shown schematically at 86. In one disclosed example, the bottoming turbine 52 generates shaft power coupled to drive at least one auxiliary system.

The bottoming fluid flow 46 from the compressor 50 may also be heated by the exhaust flow from the turbine 52 in a second heat exchanger 44. Additional heat exchangers may also be provided to reject heat energy into the bottoming fluid flow 46. In one disclosed example embodiment, a third heat exchanger 80 transfers heat from a secondary heat source 58 and/or a power electronic system 84 into the bottoming fluid flow 46. The secondary heat source 58 may be an engine lubrication system, or an electric machine. Moreover, other sources of heat associated with the core engine 22 and the aircraft may provide heat and are within the contemplation and scope of this disclosure.

The bottoming fluid flow 46 may be cooled utilizing the fuel flow 100 as a heat sink. A fuel system heat exchanger 98 provides for thermal communication of a heated bottoming flow 74 exhausted from the turbine 52. A heated fuel flow 96 exhausted from the fuel system heat exchanger 98 is communicated to the combustor 26.

Heat input into the bottoming fluid flow 46 from sources other than the exhaust gas flow 34 reduce the capacity of the bottoming fluid 46 to accept heat from the exhaust gas flow 34. In the illustrated example, heat input into the bottoming fluid 46 in the second heat exchanger 44 and the third heat exchanger 80 reduces the capacity of accepting heat from the exhaust gas flow 34. The reduced capacity of heat acceptance reduces the benefit provided by the bottoming cycle 48. The example bottoming cycle 48 includes a bypass flow passage 66 that routes at least a portion of the bottoming flow 46 around other heat input sources. In the illustrated example, the bypass passage 66 routes at least a portion of the bottoming fluid 46 around both the second heat exchanger 44 and the third heat exchanger 80.

Accordingly, a bypassed bottoming fluid flow 72 through the bypass passage 66 is much cooler and therefore has a greater capacity for absorbing heat from the exhaust gas flow 34 than the fluid flow 46 communicated through the second and third heat exchangers 44, 80.

A valve 68 is provided in the bypass passage 66 to control the amount of bottoming fluid 46 is routed around the other heat input sources. The valve 68 is controlled by a controller 70 that is programmed to operate the valve 68 to bypass a desired amount of bypassed bottoming fluid flow 72 around the second heat exchanger 44 and the third heat exchanger 80. All of the bottoming fluid 46 or some portion of the bottoming fluid 46 may be bypassed to provide for predefined amount of heat absorption capacity at the first heat exchanger 42. The bypass of bottoming fluid may be based on operational requirements or according to a predefined operating schedule.

The example controller 70 is a device and system for performing necessary computing or calculation operations of the bottoming cycle 48 including the valve 68 and any other actuators that provide for the communication and control of bottoming cycle operation. The controller 70 may be specially constructed for operation of the bottoming cycle 48, including the valve 68, or it may comprise at least a general-purpose computer selectively activated or reconfigured by software instructions stored in a memory device. The controller 70 may further be part of full authority digital engine control (FADEC) or an electronic engine controller (EEC).

The example controller 70 is programmed to control the bottoming cycle 48 by way of at least the control valve 68 to regulate the bottoming fluid flow 72 through the bypass flow passage 70. In one disclosed example, controller 70 is programmed to operate the control valve 68 to regulate bottoming fluid flow 72 through the bypass flow passage based on a temperature differential between the exhaust gas flow 34 and the bottoming fluid flow 72 to maintain a capacity of the bottoming fluid flow 72 to absorb heat from the exhaust gas flow 34 within a predefined range. The predefined range is a temperature differential that provides thermal energy to the bottoming cycle sufficient to generate a desired and/or predefined amount of power.

The first heat exchanger 42 includes a plurality of stages 60 that include a first stage 62 and a last stage 64. The first stage 62 is closer to the turbine 24 than the last stage 64 and therefore the exhaust gas flow 34 is hottest within the first stage 62. The last stage 64 is furthest from the turbine 24 and therefore the exhaust gas flow 34 is the coolest in the last stage 64. In one disclosed embodiment, the bypass passage 66 communicates the bypass bottoming fluid 72 into communication with the exhaust gas flow 34 within the last stage 64. However, the bypass bottoming fluid 72 could be communicated to other stages within the heat exchanger 42 and remain within the scope and contemplation of this disclosure.

Figure 2:
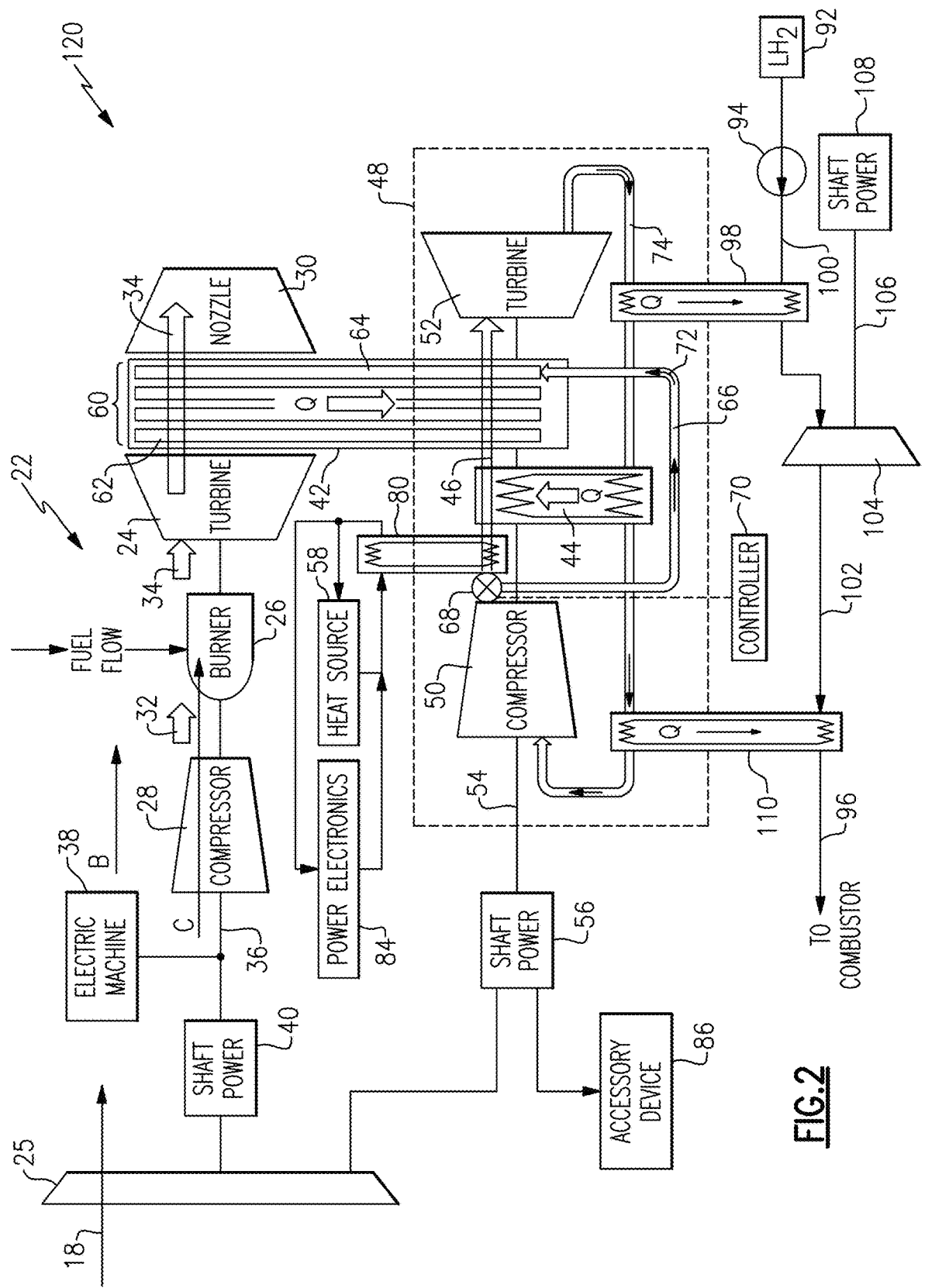
FIG. 2 is a schematic view of another example turbine engine and bottoming cycle embodiment.

Referring to FIG. 2, another example aircraft propulsion system 120 is schematically shown and includes a fuel system turboexpander 104. Heated fuel flow from the fuel system heat exchanger 98 is expanded through the turboexpander 104 to reclaim a portion of the heat energy input into the fuel flow 100. The fuel system turboexpander 104 drives a shaft 106 to generate additional shaft power 108. The additional shaft power 108 may be coupled to drive accessory devices or to provide a drive input utilized to generate thrust. Fuel exhausted from the turboexpander 104, schematically indicated at 102, is cooled and thereby includes an additional capacity for accepting heat.

Accordingly, a second fuel system heat exchanger 110 may be used to further cool the bottom fluid flow 46. Although the second fuel system heat exchanger 110 is shown by way of example as accepting additional heat energy from the bottoming fluid flow 46, the second fuel system heat exchanger 110 may be utilized to cool other engine and/or aircraft systems within the contemplation and scope of this disclosure.

Figure 3:
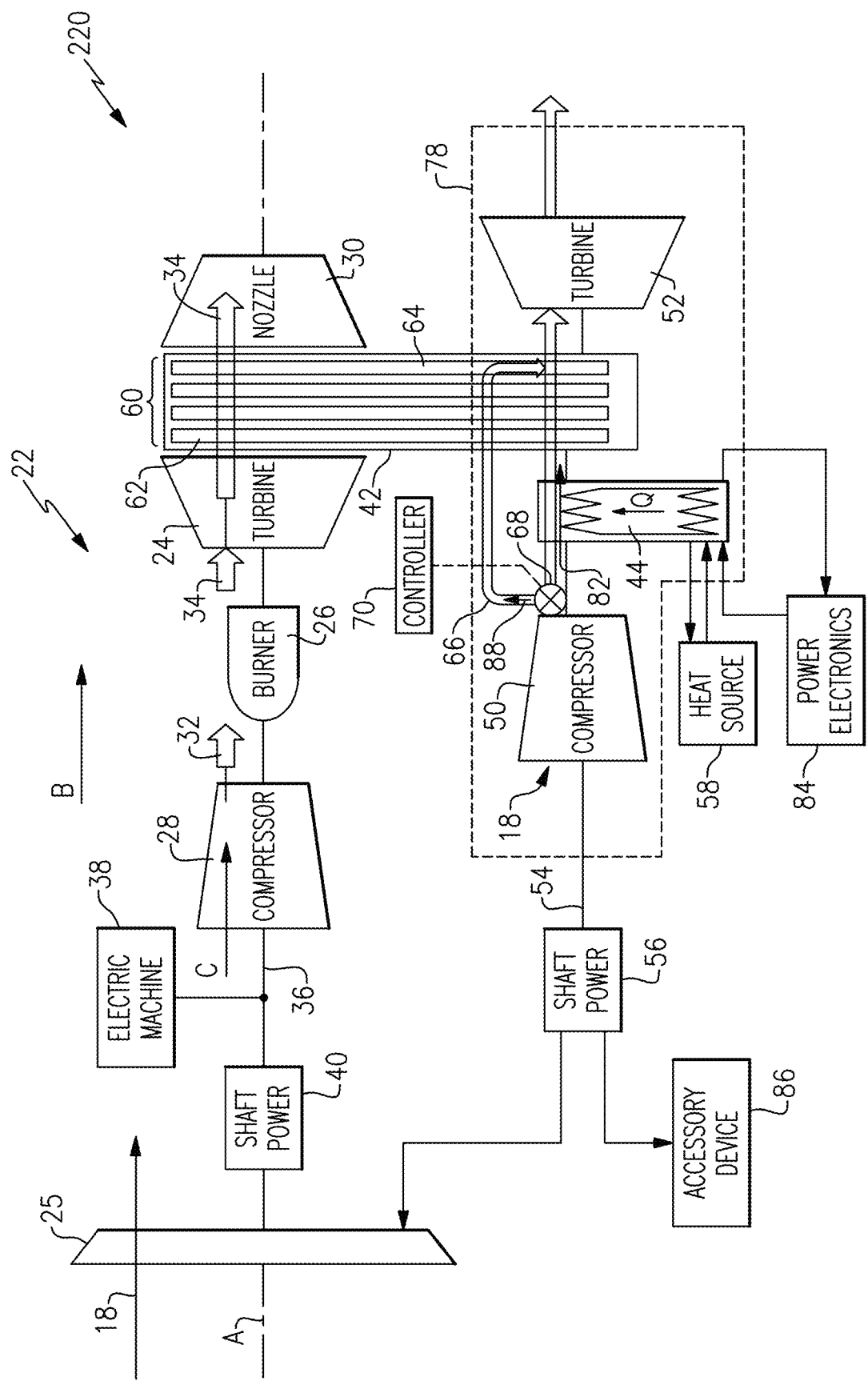
FIG. 3 is a schematic view of yet another example turbine engine and bottoming cycle embodiment.

Referring to FIG. 3, another example aircraft propulsion system 220 is schematically shown and includes an open loop bottoming cycle 78. An inlet flow, such as the air inlet flow 18 is pressurized in the bottoming compressor 50, heated with heat from the exhaust gas flow 34 in the first heat exchanger 42 and expanded through the bottoming turbine 52 to generate the shaft power 56. The bottoming air flow 82 may be heated in the second heat exchanger 44 with heat communicated from alternate heat source 58 and/or the power electronic system 84. A portion of the bottoming air flow 82 may be bypassed as a bypass air flow 88 through the bypass passage 66 directly through the first heat exchanger 42 to enable a maximum amount of heat absorption from the exhaust gas flow 34.

The controller 70 operates the valve 68 to control the amount of bottoming air flow 82 that is routed around the second heat exchanger 44. The valve 68 may be operated from a fully open position to a fully closed position and an infinite number of proportionally open positions between the fully open and closed positions. In the fully open position, all of the bottoming flow is bypassed around the second heat exchanger. In the fully closed position, all of the bottoming fluid flow is directed through the second heat exchanger. In one example disclosed embodiment, the controller 70 is programmed and configured to operate the valve 68 regulate bottoming fluid flow 72 through the bypass flow passage 66 based on a temperature differential between the exhaust gas flow 34 and the bottoming fluid flow 72 to maintain a capacity of the bottoming fluid flow 72 to absorb heat from the exhaust gas flow 34 within a predefined range.

Accordingly, the example bottoming cycle embodiments provide for routing the bottoming cycle fluid around other sources of heat to tailor waste heat capture from the exhaust gas flow to engine operating requirements.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
a core engine assembly generating an exhaust gas flow;
a bottoming cycle including a bottoming fluid flow expanded through a bottoming turbine;
a first heat exchanger where heat from the exhaust gas flow is transferred to heat the bottoming fluid flow;
a second heat exchanger where heat from a secondary heat source is transferred to heat the bottoming fluid flow, the second heat exchanger disposed upstream of the first heat exchanger such that heat from the secondary heat source preheats the bottoming fluid flow prior to accepting heat from the exhaust gas flow in the first heat exchanger; and
a bypass flow passage where at least a portion of the bottoming fluid flow is routed around the second heat exchanger and into thermal communication with the exhaust gas flow in the first heat exchanger, wherein the first heat exchanger includes a plurality of stages arranged from a forward stage to an aft stage and the bottoming fluid flow communicated through the bypass flow passage is communicated to the aft stage.

2. The aircraft propulsion system as recited in claim 1, wherein the bottoming cycle comprises a bottoming compressor compressing the bottoming fluid flow upstream of at least the first heat exchanger.

3. The aircraft propulsion system as recited in claim 2, wherein the bottoming compressor is coupled to the bottoming turbine.

4. The aircraft propulsion system as recited in claim 1, wherein an exhaust bottoming fluid flow expelled from the bottoming turbine is communicated through the second heat exchanger for heating the bottoming fluid flow.

5. The aircraft propulsion system as recited in claim 1, wherein the secondary heat source comprises at least one of an engine lubrication system, a power electronic system or an electric machine.

6. The aircraft propulsion system as recited in claim 1, including a control valve regulating the bottoming fluid flow through the bypass flow passage and a controller programmed to operate the control valve to regulate bottoming fluid flow through the bypass flow passage based on a temperature differential between the exhaust gas flow and the bottoming fluid flow to maintain a capacity of the bottoming fluid flow to absorb heat from the exhaust gas flow within a predefined range.

7. The aircraft propulsion system as recited in claim 1, including a third heat exchanger where heat from a third heat source is communicated into the bottoming fluid flow and the bypass flow passage includes a portion bypassing the third heat exchanger.

8. The aircraft propulsion system as recited in claim 1, wherein the bottoming turbine generates shaft power coupled to drive at least one auxiliary system.

9. The aircraft propulsion system as recited in claim 1, including a fuel system configured to supply a fuel flow to the core engine, the fuel system including at least one fuel system heat exchanger configured to accept heat from the bottoming fluid flow.

10. The aircraft propulsion system as recited in claim 9, including a fuel system turboexpander where a fuel flow heated in the fuel system heat exchanger is expanded to generate shaft power.

11. A bottoming cycle assembly for an aircraft propulsion system comprising:
a first heat exchanger where heat from an exhaust gas flow is transferred to heat a bottoming fluid flow;
a second heat exchanger where heat from a secondary heat source is transferred to heat the bottoming fluid flow, the second heat exchanger disposed upstream of the first heat exchanger such that heat from the secondary heat source preheats the bottoming fluid flow prior to the bottoming fluid flow accepting heat from the exhaust gas flow in the first heat exchanger;
a bottoming turbine where the bottoming fluid flow is expanded to drive a shaft; and
a bypass flow passage where at least a portion of the bottoming fluid flow is routed around the second heat exchanger and into thermal communication with the exhaust gas flow in the first heat exchanger, wherein the first heat exchanger includes a plurality of stages arranged from a forward stage to an aft stage and the bottoming fluid flow communicated through the bypass flow passage is communicated to the aft stage.

12. The bottoming cycle assembly as recited in claim 11, wherein the bottoming cycle comprises a bottoming compressor coupled to the bottoming turbine, the bottoming compressor compressing the bottoming fluid flow upstream of at least the first heat exchanger.

13. The bottoming cycle assembly as recited in claim 11, wherein the bottoming fluid flow expelled from the bottoming turbine is communicated through the second heat exchanger for heating the bottoming fluid flow.

14. The bottoming cycle assembly as recited in claim 11, including a control valve regulating the bottoming fluid flow through the bypass flow passage and a controller programmed to operate the control valve to regulate bottoming fluid flow through the bypass flow passage based on a temperature differential between the exhaust gas flow and the bottoming fluid flow to maintain a capacity of the bottoming fluid flow to absorb heat from the exhaust gas flow within a predefined range.

15. The bottoming cycle assembly as recited in claim 11, including at least one fuel system heat exchanger configured to communicate heat from the bottoming flow into a fuel flow and a fuel system turboexpander where a fuel flow heated in the fuel system heat exchanger is expanded to generate shaft power.

16. A method of recovering heat energy with a bottoming cycle of an aircraft propulsion system, the method comprising:
configuring a first heat exchanger to transfer heat from an exhaust gas flow of a core engine to heat a bottoming fluid flow;
configuring a second heat exchanger to transfer heat from a secondary heat source into the bottoming fluid flow before transferring heat into the bottoming fluid flow from the exhaust gas flow in the first heat exchanger;
bypassing a portion of the bottoming fluid flow around the second heat exchanger through a bypass flow passage such that heat from the secondary heat source is not input into the bottoming fluid flow prior to heat from the exhaust gas flow, wherein the first heat exchanger includes a plurality of stages arranged from a forward stage to an aft stage and the bottoming fluid flow communicated through the bypass flow passage is communicated to the aft stage; and expanding the bottoming fluid flow through a bottoming turbine to generate shaft power.

17. The method as recited in claim 16, wherein the bottoming cycle comprises a bottoming compressor coupled to the bottoming turbine, the bottoming compressor compressing the bottoming fluid flow upstream of at least the first heat exchanger and an exhausted bottoming fluid flow expelled from the bottoming turbine is communicated through the second heat exchanger for heating the bottoming fluid flow before being compressed in the bottoming compressor.

18. The method as recited in claim 16, including regulating a flow of the bottoming fluid flow through the bypass flow passage with a control valve operated by a controller based on a temperature differential between the exhaust gas flow and the bottoming fluid flow to maintain a capacity of the bottoming fluid flow to absorb heat from the exhaust gas flow within a predefined range.

\* \* \* \* \*